(12) United States Patent
Pakzad et al.

(10) Patent No.: US 9,820,233 B2
(45) Date of Patent: Nov. 14, 2017

(54) MOTION STATE BASED MOBILE DEVICE POSITIONING

(71) Applicant: QUALCOMM Incorporated, San Diego, CA (US)

(72) Inventors: Payam Pakzad, Mountain View, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/089,636

(22) Filed: Nov. 25, 2013

(65) Prior Publication Data
US 2015/0148057 A1    May 28, 2015

(51) Int. Cl.
| | |
|---|---|
| H04W 24/00 | (2009.01) |
| H04W 52/02 | (2009.01) |
| G01C 21/20 | (2006.01) |
| H04W 64/00 | (2009.01) |
| G01S 5/02 | (2010.01) |

(52) U.S. Cl.
CPC ...... *H04W 52/0261* (2013.01); *G01C 21/206* (2013.01); *G01S 5/0236* (2013.01); *G01S 5/0263* (2013.01); *H04W 64/00* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,263,441 B1 | 8/2007 | Janky et al. | |
| 8,504,288 B2 | 8/2013 | Kadous et al. | |
| 2012/0264446 A1* | 10/2012 | Xie | G01C 22/00 455/456.1 |
| 2012/0290254 A1 | 11/2012 | Thrun et al. | |
| 2012/0330722 A1 | 12/2012 | Volpe et al. | |
| 2013/0095849 A1 | 4/2013 | Pakzad | |
| 2013/0267251 A1* | 10/2013 | Khorashadi | H04W 4/023 455/456.3 |
| 2013/0295952 A1 | 11/2013 | Chao et al. | |
| 2014/0018095 A1* | 1/2014 | Parvizi | H04W 4/025 455/456.1 |
| 2014/0156180 A1* | 6/2014 | Marti | G01S 5/0252 701/423 |

OTHER PUBLICATIONS

International Search Report and Written Opinion—PCT/US2014/066685—ISA/EPO—dated Apr. 24, 2015.

\* cited by examiner

*Primary Examiner* — Suhail Khan
(74) *Attorney, Agent, or Firm* — Berkeley Law & Technology Group, LLP

(57) ABSTRACT

Various techniques are provided which may be implemented as methods, apparatuses and articles of manufacture for use by a mobile device or one or more computing devices to provide for or otherwise support motion state based mobile device positioning. In an example, a method may be implemented at a mobile device to identify two or more subsets of grid points corresponding to an electronic map representing a particular environment, select one of the two or more subsets of grid points for use in position estimation based, at least in part, on a motion state of the mobile device, and determine an estimated position of the mobile device based, at least in part, on the selected subset of grid points.

15 Claims, 6 Drawing Sheets

MOTION STATE BASED MOBILE DEVICE POSITIONING

BACKGROUND

1. Field

The subject matter disclosed herein relates to electronic devices, and more particularly to methods, apparatuses and articles of manufacture for use by and/or in a mobile device and/or one or more computing devices to provide for and/or otherwise support motion state based mobile device positioning.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc.

In another example, certain wireless signal-based positioning capabilities make use of wireless signals acquired from terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

Since mobile devices tend to operate on battery power, there's often a desire to serve battery power while providing a reasonable user experience. Accordingly, there is an ongoing desire to provide high-quality yet efficient positioning capabilities/processes within a mobile device.

SUMMARY

In accordance with an aspect, a method may be implemented at a mobile device, which comprises: identifying two or more subsets of grid points corresponding to an electronic map representing a particular environment; selecting one of the two or more subsets of grid points for use in position estimation based, at least in part, on a motion state of the mobile device; and determining an estimated position of the mobile device within the particular environment based, at least in part, on the selected subset of grid points.

In accordance with an aspect, a mobile device may be provided, which comprises: memory; and a processing unit to: identify two or more subsets of grid points stored in the memory as corresponding to an electronic map representing a particular environment; select one of the two or more subsets of grid points for use in position estimation based, at least in part, on a motion state of the mobile device; and determine an estimated position of the mobile device within the particular environment based, at least in part, on the selected subset of grid points.

In accordance with an aspect, a method may be implemented at a computing device, which comprises: obtaining a set of grid points corresponding to an electronic map representing a particular environment; subdividing the set of grid points to identify two or more subsets of grid points for use in position estimation by a mobile device based, at least in part, on two or more motion states corresponding to the mobile device; and transmitting at least one of the two or more subsets of grid points to the mobile device.

In accordance with an aspect a computing device may be provided which comprises: a communication interface; and a processing unit to: obtain a set of grid points corresponding to an electronic map representing a particular environment; subdivide the set of grid points to identify two or more subsets of grid points for use in position estimation by a mobile device based, at least in part, on two or more motion states corresponding to the mobile device; and initiate transmission of at least one of the two or more subsets of grid points to the mobile device via the communication interface.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
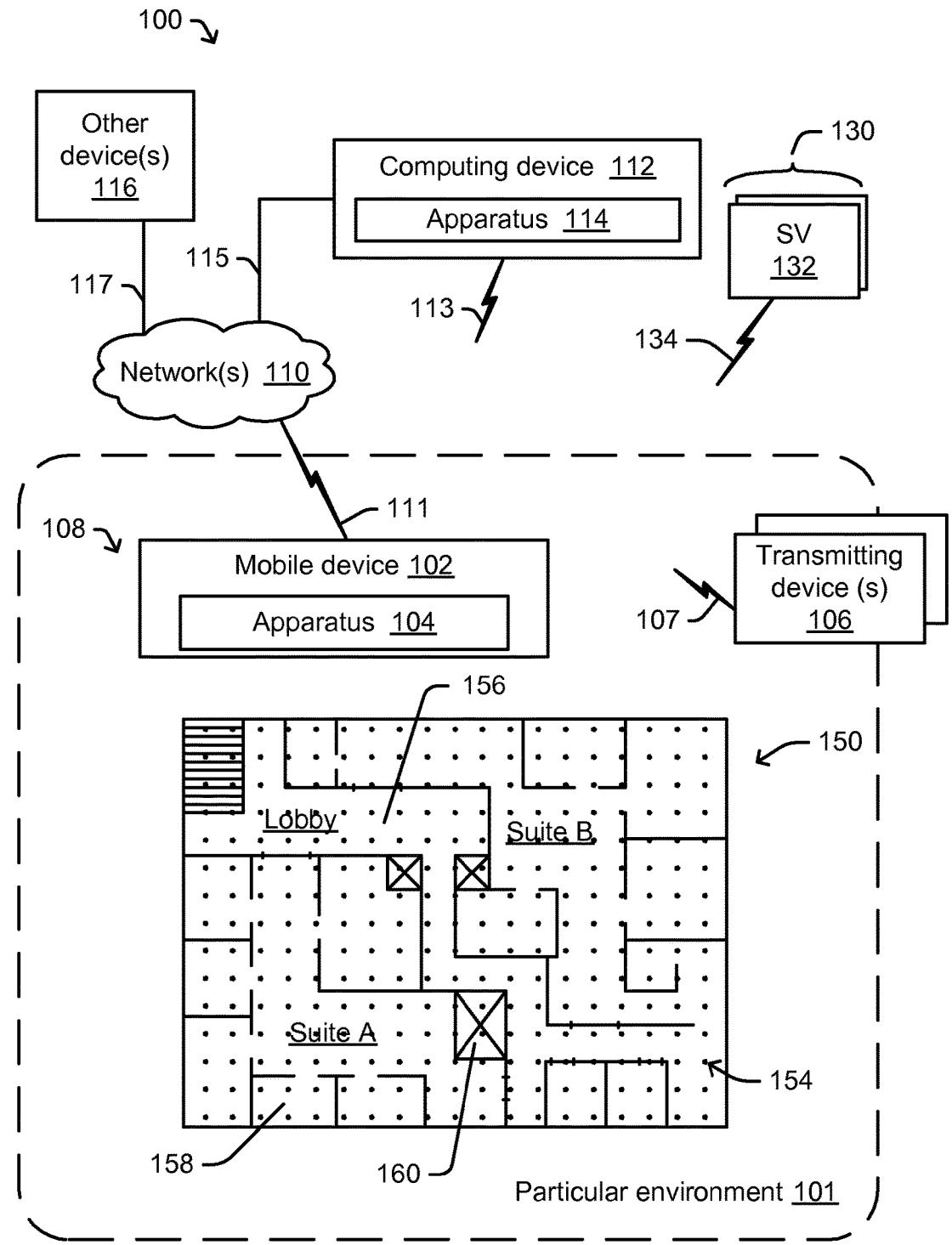
FIG. 1 is a schematic block diagram illustrating an example arrangement of representative electronic devices including an example mobile device and an example computing device one both of which may be configured to provide for and/or otherwise support motion state based mobile device positioning, in accordance with certain example implementations.

Mobile devices may be configured, for example, to obtain all or part of a position fix and/or the like by measuring ranges to terrestrial transmitting devices (e.g., wireless access points) which may be positioned at known and/or otherwise determinable locations. Such ranges may be measured, for example, by obtaining a MAC ID address from signals received from such access points and measuring one or more characteristics of signals received from such access points such as, for example, signal strength, round trip delay, just to name a few examples. Such measurements may be viewed as "direct measurements" in that they give information regarding a current position (such as a range to a transmitter fixed at a known position) when obtained.

Typically, measurements of ranges to three transmitters may be sufficient for obtaining a sufficiently accurate estimate of a position of the mobile device. In a particular example where measurements of ranges to more than three transmitters may be available, the accuracy of such an estimate may vary considerably based upon which particular measurements to which particular transmitting devices are selected for obtaining such an estimate of a position of a mobile device. For example, an inaccuracy in a range measurement to at least one transmitting device may in certain instances significantly degrade the accuracy of an estimate of a position of a mobile device computed based on the range measurement.

In addition to the use of direct measurements, certain mobile devices may incorporate "indirect measurements", which may be indicative of relative motion, to assist in obtaining an estimate of a current position estimate. Such indirect measurements may include, for example, measurements obtained from signals generated by one or more sensors such as, for example, accelerometers, pedometers, compasses, gyroscopes, and/or the like or some combination thereof. Also, in certain environments and applications, movement of a mobile device may be constrained by physical obstructions to predetermined areas or paths. In an indoor environment, for example, movement of a mobile device may be constrained to predetermined paths or routes defined according to walls, doorways, entrances, stairways, etc. As such, a current location of a mobile device may be presumed to be constrained by such predetermined areas or paths.

A motion model may process direct or indirect measurements to propagate an estimated state of a mobile device (e.g., position, velocity, trajectory, etc.). Such a motion model may comprise, for example, a filtering model such as a Kalman filter or particle filter to propagate estimated positions of a mobile device along one or more trajectories. In a particular implementation, a mobile station may employ a particle-filter over a constrained routing graph and/or the like to incorporate direct and indirect measurements subject to route constraints. For example, in certain instances, route constraints may indicate that particles may be propagated along a routing graph according to the particle state, and certain indirect information about relative position movement, each particle may be assigned a probability according to direct measurements, and/or particles may be resampled and/or otherwise process according to a probability distribution.

In certain instances, probabilities assigned to particular particles representing particular locations of an indoor area may comprise values indicative of a likelihood that a particular mobile device may be located at particular positions. For example, for a mobile device co-located with a user (e.g., a person, an animal, a machine) having just entered a particular doorway of a building and/or other like structure, a particle filter model and/or the like may assign higher probabilities to particles representing physicians nearer to the doorway and relatively lower probabilities representing locations farther away from the doorway, e.g., perhaps on the opposite side of the building from the doorway. Some particle filter models may, for example, assign probabilities to particular particles based on an estimated position and velocity of the mobile device. Unfortunately, an estimated velocity of a mobile device may be based on a series of measurements in the past. With a possibility for quick starts and stops, a velocity estimate computed based on a series of past measurements may, at times, prove stale or obsolete by the time the velocity estimate is computed.

In certain example implementations as provided herein, a mobile device may have one or more sensors such as inertial sensors (e.g., one or more accelerometers, pedometers or gyroscopes) and/or other types of sensors (e.g., light sensors, sound transducers, etc.) that may generate signals indicative of (and/or of particular use in determining) a motion state of the mobile device. For example, in certain instances, a motion state of a mobile device may be indicative of a non-transitional (e.g., substantially static) state or a transitional (e.g., a moving) state, and/or possibly different identifiable types of non-transitional and/or transitional states (e.g., walking versus running, sitting still at a desk versus sitting still on a moving mechanism/machine. Such an indication of a various types of movement or a lack thereof may, for example, represent a more reliable and immediate indication of a motion state of the mobile device than, for example, a velocity estimated computed based on a series of past measurements. According to a particular implementation, a mobile device may re-weight probabilities assigned to particular particles based, at least in part, on motion state of the mobile device detected in response to signals from one or more sensors.

In certain example implementations, certain positions in a particular environment represented by particles may be classified as either "non-transitional grid points" or "transitional grid points" based, at least in part, on a likelihood that a user would be moving (e.g., walking or running) or being relatively static (e.g., sitting, standing or lying down) at such positions within the particular environment. For example, corridors or hallways may be associated with transitional grid points while offices or rooms may be associated with non-transitional grid points. As described in greater detail herein, in certain example implementations, one or more motion state weighting parameters may be associated with one or more grid points, e.g., for use in identifying subsets of grid points which may be of particular use by a mobile device based on its motion state. It may be observed that if a user co-located with a mobile device is in dynamic state (e.g., walking or running as indicated by a signal from a sensor), the user may be more likely to be located at or nearby a transitional grid point rather than a non-transitional grid point. Likewise, it may be observed that if a user co-located with a mobile device is in more of a static state, the user may be more likely to be located at or nearby a non-transitional grid point.

In certain example implementations, values indicative of likelihoods that said mobile device is located in particular portions of an area (e.g., probabilities assigned to particular particles in a particle filtering scheme), may be altered and/or otherwise affected based, at least in part, on whether one or more signals from a sensor indicate that the mobile device is in a particular transitional state or a particular non-transitional state. As pointed out above, signals from an accelerometer or pedometer may, for example, indicate that a user co-located with the mobile device may be walking or running, or otherwise moving in a particular identifiable and/or classifiable manner. This may infer that the mobile device has an increased likelihood of being located at a transitional grid point. Likewise, if one or more signals from a sensor indicate that a user co-located with the mobile device is in a static state, this may infer that the mobile device has an increased likelihood of being located at a non-transitional grid point. In certain instances, likelihoods or probabilities assigned to particles representing transit points may be increased in response to sensor signals indicating that the mobile device is in a secular transitional state (while likelihoods or probabilities assigned to particles representing non-transitional grid points may be decreased). On the other hand, likelihoods or probabilities assigned to particles representing non-transitional grid points may be increased in response to certain sensor signals, e.g., indicating that the mobile device is in a non-transitional state (while likelihoods or probabilities assigned to particles representing transitional grid points may be decreased).

With the preceding examples in mind, several techniques are described herein by way of example which may be implemented as various methods, apparatuses and articles of manufacture for use by and/or in a mobile device and/or one or more computing devices to provide for and/or otherwise support motion state based mobile device positioning.

By way of an example, in certain implementations, a mobile device (e.g., a mobile telephone, smart phone, a tablet computer, a wearable computer, a tracking device, etc.) may be configured identify two or more subsets of grid points corresponding to an electronic map representing a particular environment. As described in greater detail, in certain instances, a mobile device may receive one or more subsets of grid points from one or more other devices which may have already been identified. For example, a mobile device may obtain one or more data files from one or more servers over network, which comprise and/or may otherwise be indicative of a plurality of subsets of grid points corresponding to an electronic map of a particular environment (e.g., all or part of one or more buildings or other structures, etc.).

In certain example implementations, a mobile device may be configured to receive a set of grid points corresponding to the electronic map from at least one other device (e.g., a computing device such as a server, etc.), and subdivide the set of grid points in some manner to identify one or more subsets of grid points.

As described in greater detail herein, in certain instances a mobile device may subdivide (e.g., physically and/or logically) a set of grid points based, at least in part, on at least one motion state weighting parameter (e.g., representing a likelihood for more or less motion, representing a likelihood for particular type of motion, etc.) for at least one grid point within the set of grid points. In certain example implementations, a mobile device may subdivide a set of grid points based, at least in part, on a motion state historical record (e.g., based on reported (e.g., estimated, expected, observed, etc.) motion state(s) from one or more mobile devices.

Those skilled in the art should recognize that an initial set of grid points may be provided in at least one data file and that certain example subdividing techniques may "logically" alter the data file(s) in some manner to indicate all or part of one or more identified subsets of grid points. In certain instances, one or more additional data files may be "physically" generated which may comprise and/or otherwise be indicative in some manner of all or part of one or more identified subsets of grid points. Of course, these are just a few examples and claimed subject matter is not intended to be so limited.

As described in greater detail herein, in certain example implementations, a mobile device may be configured to identify one or more subsets of grid points based, at least in part, on a comparison of at least one motion state weighting parameter with at least one motion state threshold value.

By way of example, in certain implementations, a first subset of grid points may be identified for use in position estimation by a mobile device while in a transitional state, and a second subset of grid points may be identified for use in position estimation by the mobile device while in different transitional state or possibly a non-transitional state. Here, for example, a first subset of grid points may be of particular use to a mobile device for position estimation while the mobile device may be actively transported, e.g., the mobile device may have a motion state indicative of some transition within a particular environment, such as, while being carried by a person running, walking, climbing/descending stairs, and/or being conveyed by some machine in some active manner, etc. As may be appreciated, such a first subset of grid points may correspond to certain regions within a structure wherein a mobile device may be more likely to be transitioning from one position to another position, such as, e.g., a hallway, a walkway, an assembly line, etc. A second subset of grid points may, however, be of particular use to a mobile device for position estimation while the mobile device may be, less actively transported, e.g., the mobile device may have a motion state indicative of some substantially static/stationary state. May be appreciated, such a second subset of grid points may correspond to certain regions within a structure wherein a mobile device may be more likely to be placed, set down, stored, and/or a person/animal/machine may reside otherwise remain completely or some what stationary/static or some period of time. For example, a non-transitional region may comprise an office, a break room, waiting room, a loading zone, a kiosk device, a restroom, a desk, a seat, a treadmill, a book or storage shelf, etc.

With two or more subsets of grid points having been identified, a mobile device may then select at least one of the subsets of grid points for use in position estimation, e.g., based, at least in part, on a motion state of the mobile device. A mobile device may, for example, determine a motion state based, at least in part, on one or more signals generated by and/or otherwise obtained from one or more sensors (e.g., an accelerometer, a gyroscope, a barometer, a light sensor, a sound transducer, etc.), just to name a few examples.

Having selected at least one of the subsets of grid points for use in position estimation, a mobile device may then determine some aspect of its estimated position within the particular environment, e.g., based, at least in part, on a selected subset of grid points.

As described in greater detail herein, in certain example implementations, a mobile device may transmit one or more messages one or more other devices, which may be indicative of a motion state of the mobile device, a motion state weighting parameter (e.g., for at least one grid point within at least one of the two or more subsets of grid points), at least one motion state threshold value, and/or the like or some combination thereof, again just to name a few examples.

In certain instances, two or more subsets of grid points may be mutually exclusive, while in other instances two or more subsets of grid points may comprise one or more common grid points. In certain instances, two or more subsets of grid points may correspond to different grid patterns (e.g., having different offsets/spacing, having different granularity/resolution, etc.). In certain example implementations, all or part of one or more subsets of grid points may be identified in a routing graph and/or the like corresponding to at least a portion of an electronic map and which may be of use for positioning, navigation, location based services, etc.

In certain example implementations, similar and/or other corresponding techniques may be implemented at one or more computing devices. By way of example, in certain implementations a computing device (e.g., a server, etc.) may obtain a set of grid points corresponding to an electronic map representing a particular environment, and subdivide (e.g., physically and/or logically) the set of grid points to identify two or more subsets of grid points for use in position estimation by one or more mobile devices based, at least in part, on two or more motion states corresponding to one or more mobile devices. The computing device may, for example, transmit (e.g., identify, provide, etc.) one or more of subsets of grid points to one or more other devices and/or one or more mobile devices.

Attention is drawn next to FIG. 1, which is a schematic block diagram illustrating an example arrangement 100 of representative electronic devices including an example mobile device 102 comprising an example apparatus 104 and an example computing device 112 comprising an example apparatus 114, one or more of which may be configured to provide for and/or otherwise support motion state based mobile device positioning, in accordance with certain example implementations.

Mobile device 102 may, for example, comprise a portable computing device, portable communication device, a portable tracking/location device, and/or the like or some combination thereof. Hence, in certain instances, mobile device 102 may comprise a cellular telephone, a smart phone, a laptop computer, a tablet computer, a navigation device, a wearable computer, a tracking mechanism, just to name a few examples.

As illustrated mobile device 102 may receive wireless signals over a communication link 111 from one or more networks 110, which may be further coupled to one or more other devices 116 via communication link 117. In certain implementations, network(s) 110 may be representative of one or more wireless communication systems, one or more cellular communication systems, one or more wired communication systems, one or more computer networks, all or part of the Internet, an intranet, a local area network, and/or various other computing and/or communication resources/devices/services.

Mobile device 102 may receive wireless signals over communication link 107 from one or more transmitting devices 106, one or more of which may be further coupled together and/or to network(s) 110 (connection not shown). Transmitting device(s) 106 may be representative of variety of different transmitting devices and/or transmitting/receiving devices that may transmit and/or receive wireless signals. In certain implementations, transmitting device(s) 106 may comprise one or more transmitting devices that may be part of or otherwise support network(s) 110 or some portion thereof. Hence, for example, transmitting device(s) 106 may represent a cellular base station, a femtocell device, a pico cell device, a WLAN access point device, a location Beacon device, and/or the like or some combination thereof, just to name a few examples. Indeed, in certain instances, transmitting device(s) 106 may represent one or more other mobile devices. In accordance with certain aspects, transmitting device(s) 106 may represent any electronic device that may transmit and/or receive wireless signals in support of various computing, communication, location, and/or other like services/capabilities provided or otherwise supported by mobile device 102. As illustrated, one or more transmitting devices 106 may be located within a particular environment 101, and/or otherwise operatively arranged to serve all or part of particular environment 101.

In certain implementations, as shown in FIG. 1, a mobile device 102 may receive or acquire SPS signals 134 from one or more space vehicles (SVs) 132, which may be part of one or more SPS 130. In some embodiments, SPS 130 may be from one global navigation satellite system (GNSS), such as the GPS or Galileo satellite systems. In other embodiments, the SVs 132 may be from multiple GNSS such as, but not limited to, GPS, Galileo, Glonass, or Beidou (Compass) satellite systems. In other embodiments, the SVs 132 may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In particular implementations, and as discussed below, mobile device 102 may have circuitry and processing resources capable of computing a position fix or estimated position (e.g., a location) of mobile device 102. For example, mobile device 102 may compute a position fix based, at least in part, on pseudorange measurements to one or more or more the SVs 132. Here, mobile device 102 may compute such pseudorange measurements based, at least in part, on pseudonoise code phase detections in SPS signals 134 acquired from four or more SVs 132. In particular implementations, mobile device 102 may receive from positioning assistance data and/or the like from a server (e.g., represented by other device(s) 116) which may be used to aid in the acquisition of SPS signals 134 including, for example, almanac, ephemeris data, Doppler search windows, just to name a few examples. In certain implementations, similar other types of positioning assistance data may be obtained by mobile device 102 from one or more other devices with regard to one or more transmitting device(s) 106.

In certain example implementations, mobile device 102 may obtain a position fix by processing signals received from terrestrial transmitting device(s) 106 (one or more of which may have fixed and/or otherwise determinable locations) using any one of several techniques such as, for example, advanced forward trilateration (AFLT) and/or OTDOA. In these particular example techniques, a range from mobile device 102 may be measured to one or more or more of such terrestrial transmitters fixed at known locations based, at least in part, on pilot signals transmitted by the transmitting device(s) 106 from fixed otherwise determinable locations and received at mobile device 102. In certain example stations, as mentioned, one or more other device(s) 116 may be capable of providing certain types of positioning assistance data to mobile device 102. By way of example, certain types of positioning assistance data may be indicative of locations and identities of terrestrial transmitting devices, which may facilitate positioning techniques such as AFLT and OTDOA. For example, a server represented by other device(s) 116 may provide all or part of a base station almanac (BSA) and/or the like, which may be indicative of locations and identities of cellular base stations, etc., in a particular region or regions.

In particular environments such as indoor environments or urban canyons, mobile device 102 may not be capable of adequately acquiring SPS signals 134 from a sufficient number of SVs 132 and/or two perform AFLT or OTDOA to compute a position fix from acquisition of signals from applicable outdoor terrestrial transmitting devices. Hence, in certain instances, mobile device 102 may be capable of computing a position fix based, at least in part, on wireless signals acquired from other transmitting devices, e.g., local/indoor transmitting devices (e.g., WLAN access points, femto cell transceivers, Bluetooth devices, etc., which may be positioned at known or otherwise determinable locations). Accordingly, in certain implementations, mobile device 102 may obtain all or part of a position fix by measuring ranges to one or more indoor terrestrial wireless access point devices and/like. Such ranges may be measured, for example, by obtaining a MAC ID address from wireless signals received from such a transmitting device and obtaining range measurements to the transmitting device (e.g., at least in part, by measuring one or more characteristics of the received signals). By way of example, in certain implementations a received signal strength (RSSI), a round trip time (RTT), an angle of arrival (AOA), and/or the like or some combination thereof may be determined/considered. In certain implementations, mobile device 102 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address and/or some other distinctly unique identifier which may be discernible from a signal acquired from a local transmitter), expected RSSI from signals transmitted by the identified local transmitting devices, an expected RTT from the identified transmitting devices, and possibly standard deviations from these expected RSSI or RTT. It should be understood, however, that these are merely examples of values that may be stored in, modeled, and/or otherwise functionally/mathematically represented by a radio heatmap and/or the like, and that claimed subject matter is not limited in this respect.

In addition to measurements obtained from the acquisition of wireless signals from local transmitting devices, according to a particular embodiment, mobile device 102 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating all or part of a position and/or a motion state of mobile device 102.

Arrangement 100 further includes example computing device 112 comprising apparatus 114, which may communicate with mobile device 102, e.g., via communication link 115, network(s) 110, and communication link 111, or possibly in a more direct manner as represented by indication link 113. As previously mentioned, in certain example implementations, mobile device 102 may select a particular subset of grid points for use in position estimation based, at least in part, on its motion state. In certain instances, one or more subsets of grid points may be identified and provided by computing device 112 and/or apparatus 114 to mobile device 102 and/or apparatus 104. In some instances, mobile device 102 and/or apparatus 104 may identify one or more subsets of grid points, e.g., based on a larger set of grid points which may be obtained from computing device 112 and/or one or more other devices 116. While illustrated as being outside of particular environment 101, it should be understood that all or part of computing device 112, other devices 116, and/or network(s) 110 may be provisioned within a particular environment 101.

As shown in FIG. 1, certain instances a particular environment 101 may comprise all or part of one or more structures having one or more regions therein through which and/or within which a mobile device may be moved/positioned. By way of example, a floor plan 150 is illustrated for a portion of a building having various regions, with various obstacles and/or other aspects which may affect movement and/or positioning of a mobile device in some manner. Additionally, floor plan 150 is illustrated as having an example overlay of grid points 154, one or more of which may correspond to particular types of transitional grid points and/or non-transitional grid points. By way of example, in certain instances some grid points within region 156 (e.g., which comprises a "lobby" and adjoining hallways separating office suites A and B) and/or region 160 (e.g., which comprises an elevator mechanism serving multiple floors within a structure) may be identified as representing certain types of transitional grid points. Conversely, by way of example, in certain instances some grid points within region 158 (e.g., which comprises an office or room) may be identified as representing certain types of non-transitional grid points. While in this example all of the grid points 154 are fairly uniform in their arrangement, it should be kept in mind that in certain other implementations grid points may be arranged in a variety of different ways, some of which may be more or less uniform than others, and which may vary in different configurations depending upon the region within the structure.

Figure 2A:
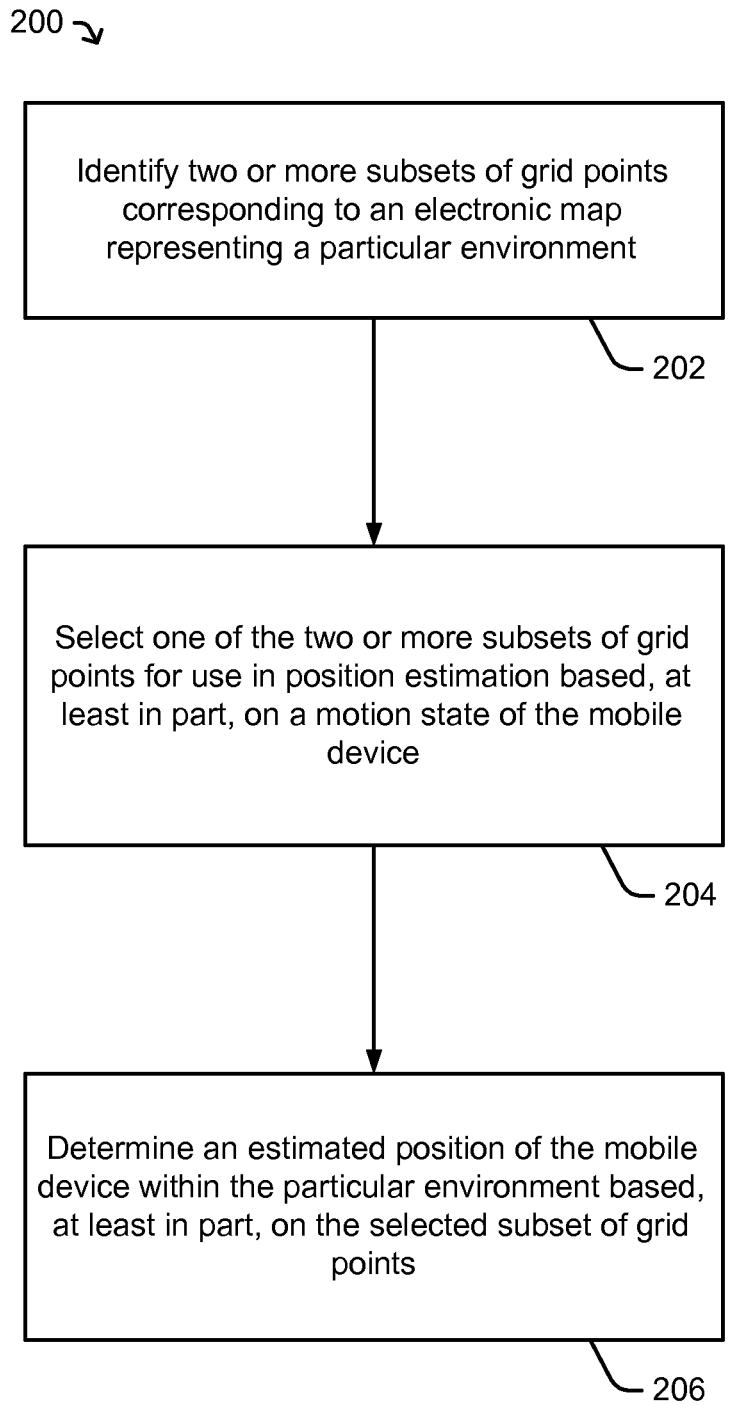
FIG. 2A and FIG. 2B are flow diagrams illustrating some example processes that may be implemented in a mobile device, e.g., as in FIG. 1, to provide for and/or otherwise support motion state based mobile device positioning, in accordance with certain example implementations.

Attention is drawn next to FIG. 2A, which is a flow diagram illustrating an example process 200 that may be implemented in mobile device 102 and/or apparatus 104, e.g., to provide for and/or otherwise support motion state based mobile device positioning. At example block 202, two or more subsets of grid points corresponding to an electronic map representing a particular environment may be identified. At example block 204, one of the two or more subsets of grid points may be selected for use in position estimation based, at least in part, on a motion state of the mobile device. At example block 206, an estimated position of the mobile device within the particular environment may be determined based, at least in part, on the selected subset of grid points.

Figure 2B:
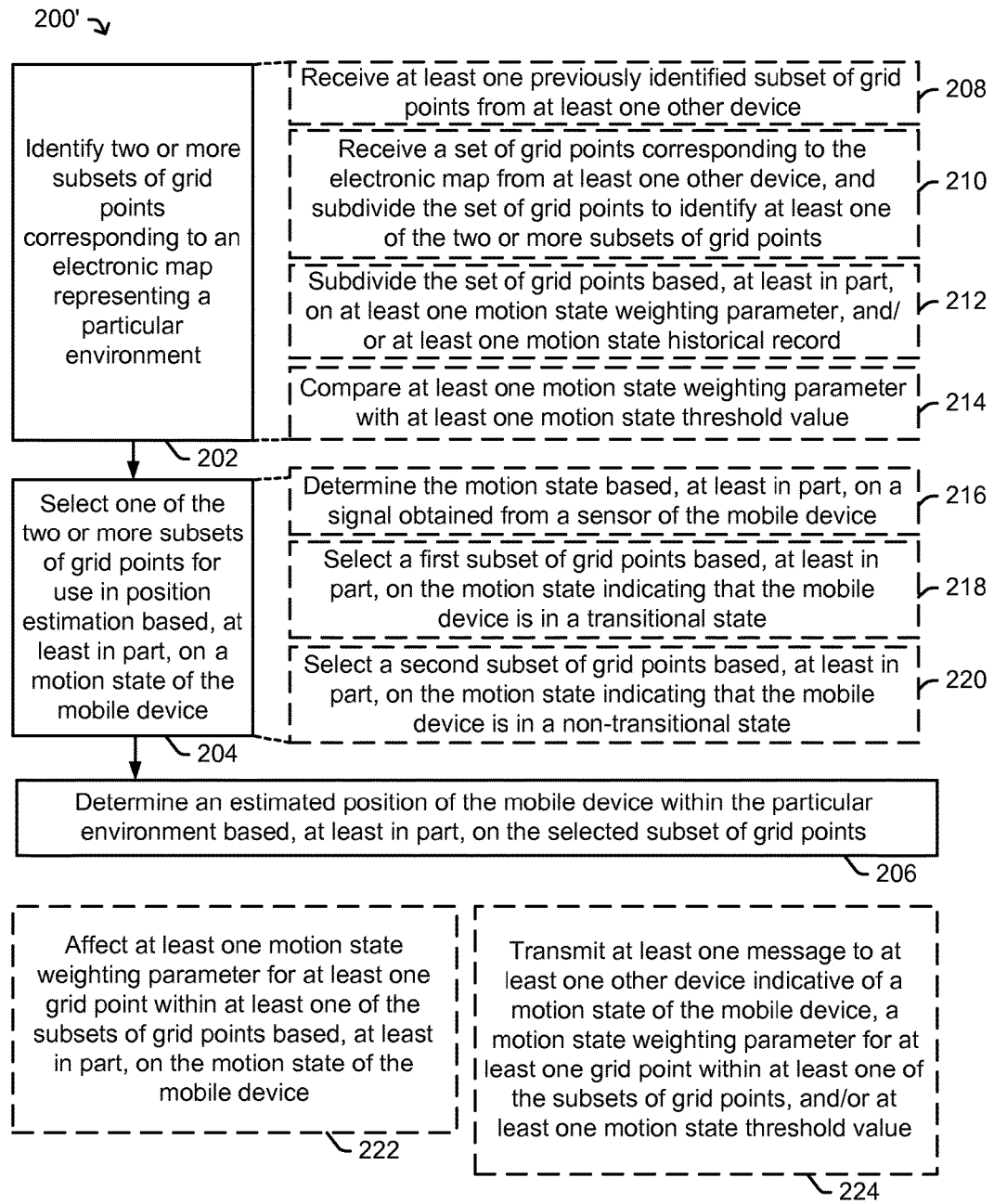

Attention is drawn next to FIG. 2B, which is a flow diagram illustrating an example process 200' that may be implemented in mobile device 102 and/or apparatus 104, e.g., to provide for and/or otherwise support motion state based mobile device positioning. In this example, some optional/alternative techniques are illustrated using dashed-line blocks.

At example block 202, two or more subsets of grid points corresponding to an electronic map representing a particular environment may be identified. In certain instances, at example block 208, at least one previously identified subset of grid points may be received from at least one other device, e.g., computing device 112, other device(s) 116, network(s) 110, transmitting device(s) 106, and/or the like him combination thereof. In certain instances, at block 210 a set of grid points corresponding to the electronic map may be received from at least one other device, and subdivided (e.g., physically and/or logically) to identify at least one subset of grid points. In certain instances, at block 212, a set of grid points may be subdivided based, at least in part, on at least one motion state weighting parameter, and/or at least one motion state historical record. In certain instances, at block 214, at least one motion state weighting parameter may be compared with at least one motion state threshold value.

At example block 204, one of the subsets of grid points may be selected for use in position estimation based, at least in part, on a motion state of the mobile device. In certain instances, at block 216, a motion state may be determined based, at least in part, on at least one signal obtained from at least one sensor of the mobile device. In certain instances, at block 218, a first subset of grid points may be selected based, at least in part, on the motion state indicating that the mobile device is in a transitional state. In certain instances, at block 220, a second subset of grid points may be selected based, at least in part, on the motion state indicating that the mobile device is in a non-transitional state.

At example block 206, an estimated position of the mobile device within the particular environment may be determined based, at least in part, on the selected subset of grid points.

As part of and/or in addition to example blocks 202, 204, and/or 206, at least one motion state weighting parameter for at least one grid point within at least one of the subsets of grid points may be affected (e.g., changed, established, deleted, etc.) based, at least in part, on the motion state of the mobile device, e.g., as illustrated at example block 222. For example, a motion state weighting parameter may be affected in some manner to better indicate and/or otherwise adjust/update certain movements or lack thereof by mobile device while located at or nearby a particular grid point.

As part of and/or in addition to example blocks 202, 204, and/or 206, as illustrated at example block 224, at least one message may be transmitted to another device to indicate a motion state of the mobile device, a motion state weighting parameter for at least one grid point within at least one of the subsets of grid points, and/or at least one motion state threshold value. In this manner, for example, mobile device 102 may provide feedback to another device, e.g., computing device 112, which may support techniques provided herein for identifying various subsets of grid points, and/or which may support other applicable techniques that apply feedback, crowd sourcing, other types of data gathering.

Figure 3A:
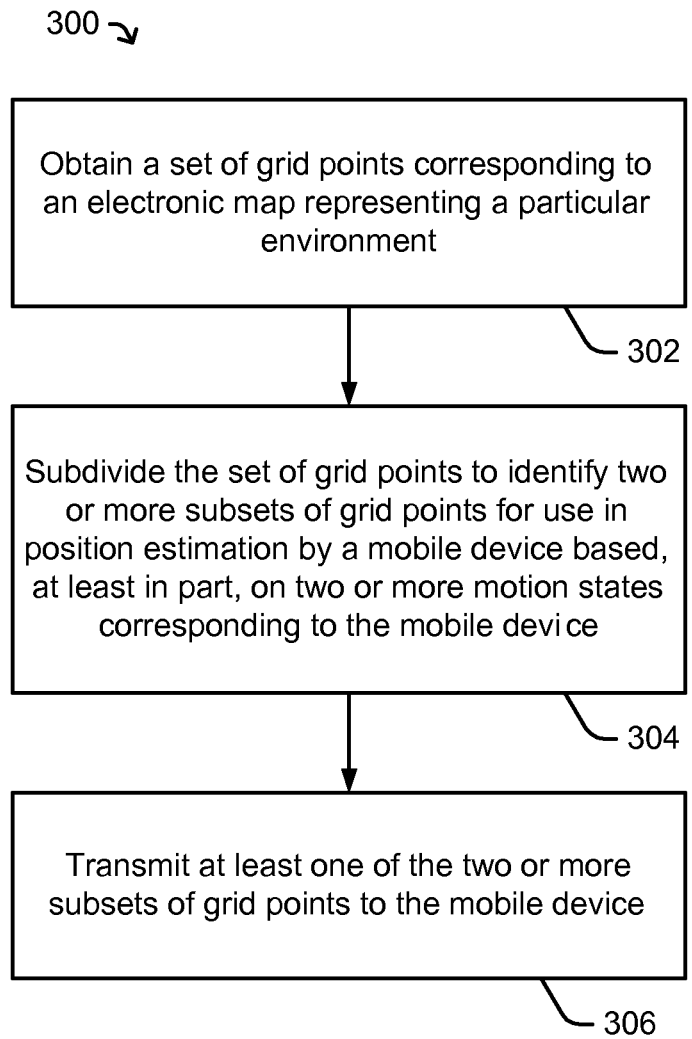
FIG. 3A and FIG. 3B are flow diagrams illustrating some example processes that may be implemented in a computing device, e.g., as in FIG. 1, to provide for and/or otherwise support motion state based mobile device positioning, in accordance with certain example implementations.

Attention is drawn next to FIG. 3A, which is a flow diagram illustrating an example process 300 that may be implemented in a computing device 112 and/or apparatus 114 (FIG. 1), e.g., to provide for and/or otherwise support motion state based mobile device positioning, in accordance with certain example implementations implementation. At example block 302, a set of grid points corresponding to an electronic map representing a particular environment may be obtained. For example, in certain instances computing device 112 may obtain all or part of a set of grid points from other devices 116. At example block 304, the set of grid points may be subdivided (e.g., physically and/or logically) to identify two or more subsets of grid points for use in position estimation by a mobile device based, at least in part, on two or more motion states corresponding to the mobile device. At example block 306, at least one of the two or more subsets of grid points may be transmitted ((e.g., directly or indirectly) to one or more mobile devices.

Figure 3B:
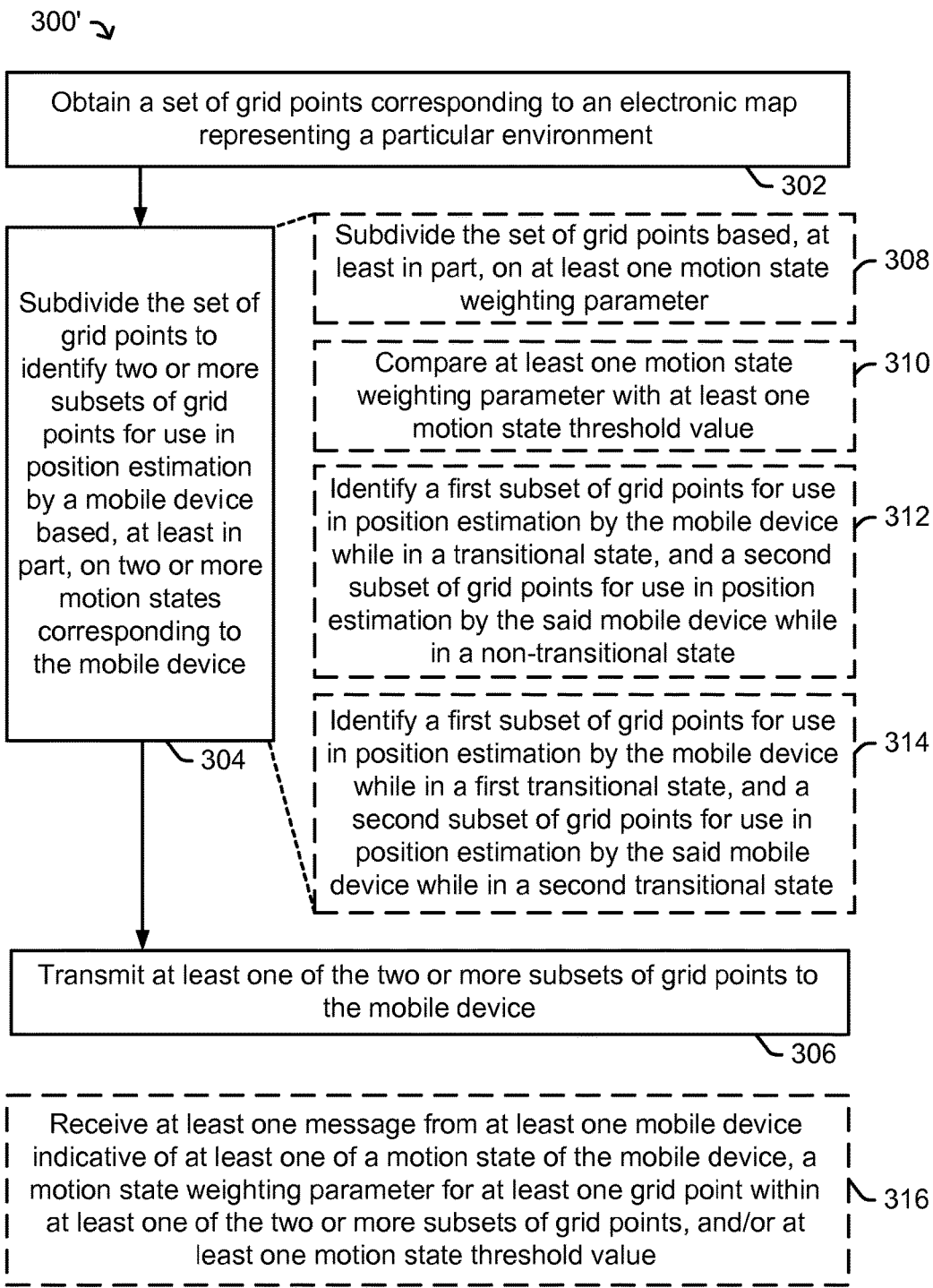

Attention is drawn next to FIG. 3B, which is a flow diagram illustrating an example process 300' that may be implemented in computing device 112 and/or apparatus 114, e.g., to provide for and/or otherwise support motion state based mobile device positioning. In this example, some optional/alternative techniques are illustrated using dashed-line blocks.

At example block 302, a set of grid points corresponding to an electronic map representing a particular environment may be obtained. For example, in certain instances computing device 112 may obtain all or part of a set of grid points from other devices 116.

At example block 304, the set of grid points may be subdivided (e.g., physically and/or logically) to identify two or more subsets of grid points for use in position estimation by a mobile device based, at least in part, on two or more motion states corresponding to the mobile device. In certain instances, at example block 308, the set of grid points may be subdivided based, at least in part, on at least one motion state weighting parameter. In certain instances, at example block 310, at least one motion state weighting parameter may be compared with at least one motion state threshold value. In certain instances, at example block 312, a first subset of grid points may be identified for use in position estimation by the mobile device while in a transitional state, and a second subset of grid points may be identified for use in position estimation by the said mobile device while in a non-transitional state. In certain instances, at example block 314, a first subset of grid points may be identified for use in position estimation by the mobile device while in a first transitional state, and a second subset of grid points may be identified for use in position estimation by the said mobile device while in a second transitional state.

At example block 306, at least one of the two or more subsets of grid points may be transmitted ((e.g., directly or indirectly) to one or more mobile devices.

As part of and/or in addition to example blocks 302, 304, and/or 306, as illustrated at example block 316, at least one message may be received from at least one mobile device, which indicates at least one of: a motion state of the mobile device, a motion state weighting parameter for at least one grid point within at least one of the two or more subsets of grid points, and/or at least one motion state threshold value.

Figure 4:
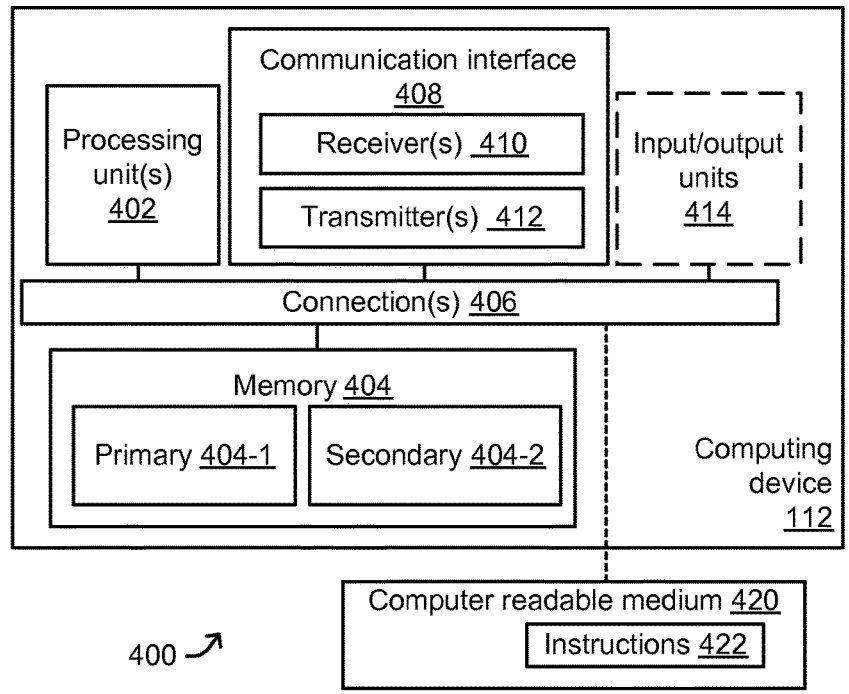
FIG. 4 is a schematic diagram illustrating certain features of an example computing platform that may be provisioned within a mobile device, e.g., as in FIG. 1, in accordance with certain example implementations.

FIG. 4 is a schematic diagram illustrating certain features of an example special purpose computing platform 400 that may be provided within computing device 112 and/or apparatus 114 (FIG. 1) according to the various techniques provided herein.

As illustrated special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within computing device 112. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420.

Memory 404 and/or non-transitory computer readable medium 420 may comprise instructions 422 for use in performing data processing, e.g., in accordance with the applicable techniques as provided herein.

Special purpose computing platform 400 may, for example, further comprise a communication interface 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations communication interface 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Computing device 112 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

Figure 5:
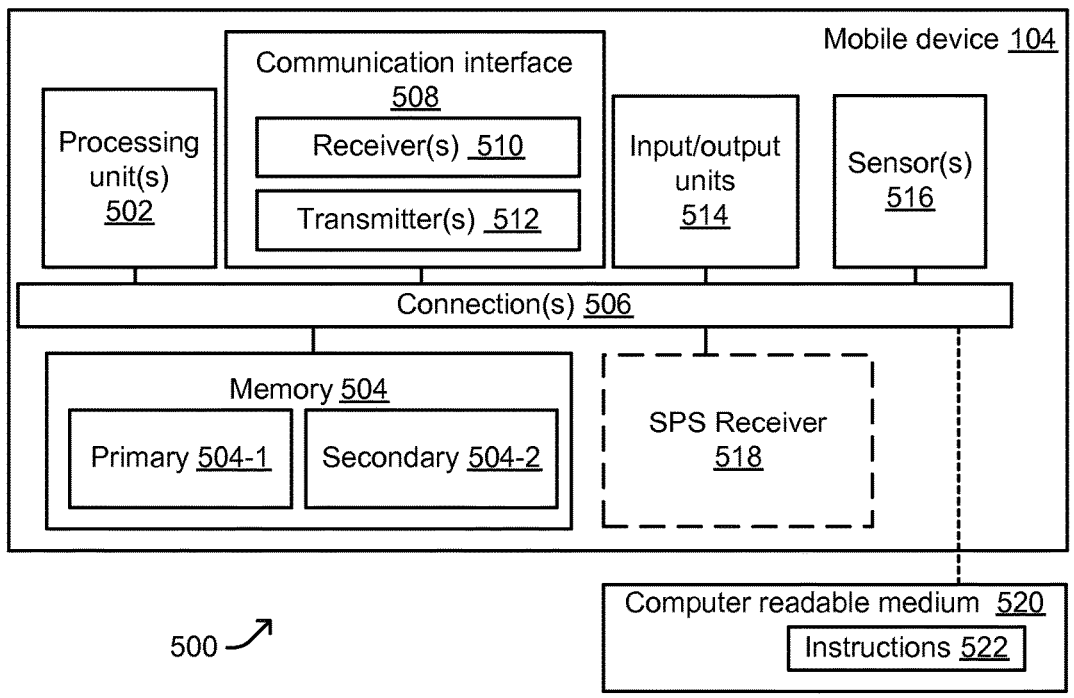
FIG. 5 is a schematic diagram illustrating certain features of an example computing platform that may be provisioned within a computing device, e.g., as in FIG. 1, in accordance with certain example implementations.

FIG. 5 is a schematic diagram illustrating certain features of an example special purpose computing platform 500 that may be provided within mobile device 102 or apparatus 104 (FIG. 1) according to the various techniques provided herein.

As illustrated computing platform 500 may comprise one or more processing units 502 (e.g., to perform data processing in accordance with certain techniques provided herein) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located and coupled with processing unit 502 or other like circuitry within mobile device 102. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

Special purpose computing platform 500 may, for example, further comprise one or more communication interface 508. Communication interface 508 may, for example, comprise one or more wired and/or wireless network interface units, radios, modems, etc., represented here by one or more receivers 510 and one or more transmitters 512. It should be understood that in certain implementations, communication interface 508 may comprise one or more transceivers, and/or the like. Further, it should be understood that although not shown, communication interface 508 may comprise one or more antennas and/or other circuitry as may be applicable given the communication interface capability.

In accordance with certain example implementations, communication interface 508 may, for example, be enabled for use with various wired communication networks, e.g., such as telephone system, a local area network, a wide area network, a personal area network, an intranet, the Internet, etc.

Mobile device 102 may, for example, further comprise one or more input and/or output units 514. Input and/or output units 514 may represent one or more devices or other like mechanisms that may be used to obtain inputs from and/or provide outputs to one or more other devices and/or a user. Thus, for example, input and/or output units 514 may comprise various buttons, switches, a touch pad, a trackball, a joystick, a touch screen, a keyboard, a microphone, a camera, and/or the like, which may be used to receive one or more user inputs. In certain instances, input and/or output units 514 may comprise various devices that may be used in producing a visual output, an audible output, and/or a tactile output for a user. For example, input and/or output units 514 may be used to present a video display, graphical user interface, positioning and/or navigation related information, visual representations of electronic map, routing directions, etc., via a display mechanism and/or audio mechanism.

Mobile device 102 may, for example, comprise one or more sensors 516. For example, sensor(s) 516 may represent one or more environmental sensors, such as, e.g., a magnetometer or compass, a barometer or altimeter, etc., and which may be useful for positioning and/or determining a motion state. For example, sensor(s) 516 may represent one or more inertial sensors, which may be useful in detecting certain movements of mobile device 102. Thus for example, sensor(s) 516 may comprise one or more accelerometers, one or one or more gyroscopes. Further, in certain instances sensor(s) 516 may comprise and/or take the form of one or more input devices such as a sound transducer, a microphone, a camera, a light sensor, etc.

SPS receiver 518 may be capable of acquiring and acquiring SPS signals 134 via one or more antennas (not shown). SPS receiver 518 may also process, in whole or in part, acquired SPS signals 134 for estimating a position and/or a motion of mobile device 102. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and down converted at receiver(s) 510 of communication interface 508 or SPS receiver 518. Similarly, a modem processor or the like may perform baseband processing of signals to be up converted for transmission by (wireless) transmitter(s) 512.

In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

In accordance with certain aspects, an apparatus may be provided for use in a mobile device, which comprises: means for identifying two or more subsets of grid points corresponding to an electronic map representing a particular environment; means for selecting one of the two or more subsets of grid points for use in position estimation based, at least in part, on a motion state of the mobile device; and means for determining an estimated position of the mobile device within the particular environment based, at least in part, on the selected subset of grid points. In certain instances, such an apparatus may further comprise one or more of: means for receiving at least one previously identified subset of grid points from at least one other device; means for receiving a set of grid points corresponding to the electronic map from at least one other device and means for subdividing the set of grid points to identify at least one of the two or more subsets of grid points; means for subdividing the set of grid points to identify at least one of the two or more subsets of grid points based, at least in part, on at least one motion state weighting parameter for at least one grid point within the set of grid points; means for affecting at least one motion state weighting parameter for at least one grid point within at least one of the two or more subsets of grid points based, at least in part, on the motion state of the mobile device; means for transmitting at least one message to at least one other device, the message being indicative of at least one of: the motion state of the mobile device; a motion state weighting parameter for at least one grid point within at least one of the two or more subsets of grid points; and/or at least one motion state threshold value; and/or means for determining the motion state based, at least in part, on a signal obtained from a sensor of the mobile device.

In accordance with certain aspects, an article of manufacture may be provided which comprises, a non-transitory computer-readable medium having stored therein computer implementable instructions executable by a processing unit of a mobile device to: identify two or more subsets of grid points corresponding to an electronic map representing a particular environment; select one of the two or more subsets of grid points for use in position estimation based, at least in part, on a motion state of the mobile device; and determine an estimated position of the mobile device within the particular environment based, at least in part, on the selected subset of grid points.

In accordance with certain aspects, an apparatus may be provided for use in a computing device, which comprises: means for obtaining a set of grid points corresponding to an electronic map representing a particular environment; means for subdividing the set of grid points to identify two or more subsets of grid points for use in position estimation by a mobile device based, at least in part, on two or more motion states corresponding to the mobile device; and means for transmitting at least one of the two or more subsets of grid points to the mobile device. In certain instances, such an apparatus may further comprise one of more of: means for subdividing the set of grid points to identify at least one of the two or more subsets of grid points based, at least in part, on at least one motion state weighting parameter for at least one grid point within the set of grid points; means for comparing at least one motion state weighting parameter with at least one motion state threshold value; means for identifying a first subset of grid points of the two or more subsets of grid points for use in position estimation by the mobile device while in a transitional state and means for identifying a second subset of grid points of the two or more subsets of grid points for use in position estimation by the mobile device while in a non-transitional state; means for identifying a first subset of grid points of the two or more subsets of grid points for use in position estimation by the mobile device while in a first transitional state and means for identifying a second subset of grid points of the two or more subsets of grid points for use in position estimation by the mobile device while in a second transitional state; and/or means for receiving at least one message from at least one mobile device, the message being indicative of at least one of a motion state of the mobile device, a motion state weighting parameter for at least one grid point within at least one of the two or more subsets of grid points, and/or at least one motion state threshold value.

In accordance with certain aspects, an article of manufacture may be provided which comprises a non-transitory computer-readable medium having stored therein computer implementable instructions executable by a processing unit of a computing device to: obtain a set of grid points corresponding to an electronic map representing a particular environment; subdivide the set of grid points to identify two or more subsets of grid points for use in position estimation by a mobile device based, at least in part, on two or more motion states corresponding to the mobile device; and initiate transmission of at least one of the two or more subsets of grid points to the mobile device.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
 identifying two or more subsets of grid points corresponding to an electronic map representing a particular environment, wherein said two or more subsets of grid points comprise a first subset including a first plurality of grid points representative of a first transitional region including one or more hallways or one or more corridors, or a combination thereof, within said particular environment for use in position estimation by said mobile device while in a first transitional motion state and a second subset including a second plurality of grid points representative of a second transitional region for use in position estimation by said mobile device while in a second transitional motion state;

selecting said first subset of grid points representative of said first transitional region for use in position estimation by the mobile device based, at least in part, on a determination that said mobile device is in said first transitional motion state based at least in part on at least one signal from at least one motion sensor; and determining an estimated position of said mobile device within said particular environment based at least in part on said selected first subset of grid points.

2. The method as recited in claim 1, wherein said identifying said two or more subsets of grid points comprises:
obtaining at least one previously identified subset of grid points from at least one other device.

3. The method as recited in claim 1, wherein said identifying said two or more subsets of grid points comprises:
obtaining a set of grid points corresponding to said electronic map from at least one other device; and
subdividing said set of grid points to identify at least one of said two or more subsets of grid points.

4. The method as recited in claim 3, and further comprising, at said mobile device:
subdividing said set of grid points to identify at least one of said two or more subsets of grid points based, at least in part, on at least one motion state weighting parameter for at least one grid point within said set of grid points.

5. The method as recited in claim 1, wherein said selecting said first subset of grid points is further based, at least in part, on at least one weighting parameter, wherein said at least one weighting parameter is re-weighted based, at least in part, on at least one additional signal from said at least one motion sensor.

6. The method as recited in claim 1, wherein said identifying said two or more subsets of grid points further comprises identifying an additional subset of grid points representative of a non-transitional region for use in position estimation by said mobile device while in a substantially stationary motion state, wherein said non-transitional region comprises an office, break room, waiting room, loading zone, restroom, kiosk device, desk, seat or storage shelf, or a combination thereof.

7. The method as recited in claim 1, and further comprising, at said mobile device:
communicating at least one message between said mobile device and at least one other device, said at least one message being indicative of:
said first transitional motion state of said mobile device;
at least one motion state weighting parameter for at least one grid point within said first subset of grid points; or
at least one motion state threshold value, or some combination thereof.

8. A mobile device comprising:
a memory; and
a processing unit to:
identify two or more subsets of grid points to be stored in said memory to correspond to an electronic map to represent a particular environment, wherein said two or more subsets of grid points to comprise a first subset to include a first plurality of grid points to be representative of a first transitional region to include one or more hallways or one or more corridors, or a combination thereof, within said particular environment for use in position estimation by the processing unit while said mobile device is in a first transitional motion state and a second subset to include a second plurality of grid points to be representative of a second transitional region for use in position estimation by said mobile device while in a second transitional state;

select said first subset of grid points representative of said first transitional region for use in position estimation based, at least in part, on a determination that said mobile device is in said first transitional motion state based at least in part on at least one signal from at least one motion sensor; and determine an estimated position of said mobile device within said particular environment.

9. The mobile device as recited in claim 8, and further comprising:
a communication interface; and
said processing unit to further obtain at least one subset of grid points to have been previously identified from at least one other device via said communication interface.

10. The mobile device as recited in claim 8, and further comprising:
a communication interface; and
said processing unit to further: obtain a set of grid points to correspond to said electronic map from at least one other device via said communication interface; and subdivide said set of grid points to identify at least one of said two or more subsets of grid points.

11. The mobile device as recited in claim 8, wherein, to select said first subset of grid points, select said first subset of grid points based, at least in part, on at least one weighting parameter, wherein said at least one weighting parameter to be re-weighted based, at least in part, on at least one additional signal from said at least one motion sensor.

12. The mobile device as recited in claim 8, wherein, to select said two or more subsets of grid points, said processor to select an additional subset of grid points representative of a non-transitional region for use in position estimation by said processing unit while the mobile device is in a substantially stationary state, wherein said non-transitional region to comprise an office, break room, waiting room, loading zone, restroom, kiosk device, desk, seat or storage shelf, or a combination thereof.

13. The mobile device as recited in claim 8, and further comprising:
a communication interface; and
said processing unit to further initiate communication of at least one message between said mobile device and at least one other device via said communication interface, said at least one message to be indicative of: said first transitional motion state of said mobile device; said at least one motion state weighting parameter for said at least one grid point within said first subset of grid points; or at least one motion state threshold value, or some combination thereof.

14. The mobile device as recited in claim 8, wherein said processing unit to further determine said first transitional motion state based, at least in part, on said at least one signal from said at least one motion sensor.

15. The mobile device as recited in claim 8, wherein at least one of said two or more subsets of grid points are to be identified in a routing graph to correspond to at least a portion of said electronic map.

\* \* \* \* \*